(12) United States Patent
Harrell (10) Patent No.: US 11,019,192 B2
(45) Date of Patent: May 25, 2021

(54) AUXILIARY USER INTERFACE AND METHOD

(71) Applicant: Eric Harrell, Cleburne, TX (US)

(72) Inventor: Eric Harrell, Cleburne, TX (US)

( * ) Notice: Subject to any disclaimer, the term of this patent is extended or adjusted under 35 U.S.C. 154(b) by 0 days.

(21) Appl. No.: 16/254,867

(22) Filed: Jan. 23, 2019

(65) Prior Publication Data
US 2021/0014352 A1    Jan. 14, 2021

(51) Int. Cl.
*H04M 1/72409* (2021.01)
*H04M 1/02* (2006.01)
*H04B 1/3888* (2015.01)

(52) U.S. Cl.
CPC ...... *H04M 1/72409* (2021.01); *H04B 1/3888* (2013.01); *H04M 1/0266* (2013.01)

(58) Field of Classification Search
CPC ...... G06F 3/041; G06F 3/0488; G06F 1/1632; G06F 1/1656; G06F 2200/1633; G06F 1/1626; G06F 1/1628; G06F 3/044; G06F 3/03547; H04B 1/3888; H04B 1/38; H04M 1/185; H04M 1/0249; H04M 1/0262; H04M 1/0274; H04M 1/0202; H04M 1/026; H04M 1/72527; H04M 1/0266; H04M 1/72519; H04M 2250/22; H04M 1/72409; H04W 24/02
See application file for complete search history.

(56) References Cited

U.S. PATENT DOCUMENTS

| 8,554,287 B1 | 10/2013 | Rao | |
| 8,825,124 B1 | 9/2014 | Davies et al. | |
| 2012/0223872 A1* | 9/2012 | Ram | G06F 1/1601 345/1.3 |
| 2012/0262618 A1* | 10/2012 | Weakly | A45C 11/22 348/333.01 |
| 2013/0050164 A1* | 2/2013 | Rericha | G06F 1/1626 345/205 |
| 2013/0053097 A1* | 2/2013 | Phillips | G06F 3/0416 455/556.1 |
| 2013/0088410 A1* | 4/2013 | Hill | G06F 3/1431 345/1.1 |
| 2013/0150120 A1* | 6/2013 | Wu | G06F 1/1626 455/556.1 |
| 2013/0241839 A1* | 9/2013 | Walker | G06F 3/04845 345/173 |
| 2014/0092108 A1 | 4/2014 | Moon et al. | |
| 2014/0141838 A1* | 5/2014 | Cai | H04M 1/72575 455/557 |
| 2014/0195826 A1* | 7/2014 | Wojcik | H05K 5/0086 713/300 |

(Continued)

*Primary Examiner* — Daniel Lai
(74) *Attorney, Agent, or Firm* — Runyan Law; Charles Runyan (57) ABSTRACT

An auxiliary user interface for a mobile device is disclosed herein. The auxiliary user interface includes a mobile device encasement configured to enclose the mobile device and an auxiliary capacitive touchscreen fixed to the mobile device encasement and configured to communicably couple with the mobile device when the mobile device encasement is attached to the mobile device. The auxiliary capacitive touchscreen is configured to operate as a user interface of the mobile device. The auxiliary user interface may be useful for providing protection and an auxiliary interface for the mobile device.

13 Claims, 5 Drawing Sheets

(56) References Cited

U.S. PATENT DOCUMENTS

| | | | |
|---|---|---|---|
| 2014/0323182 A1* | 10/2014 | Kim | H04M 1/72409 |
| | | | 455/566 |
| 2015/0198978 A1 | 7/2015 | Catchpole | |
| 2015/0270734 A1 | 9/2015 | Davison et al. | |
| 2016/0013829 A1 | 1/2016 | Battle | |
| 2018/0039300 A1* | 2/2018 | Gonzalez, III | G06F 1/1601 |
| 2019/0258300 A1* | 8/2019 | Gerardi | G06F 1/1632 |

* cited by examiner

AUXILIARY USER INTERFACE AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to user interfaces, and more specifically relates to an auxiliary user interface for a mobile device.

RELATED ART

Mobile devices such as smartphones and tablets are used for communication, game playing, multimedia sharing, networking, and a variety of other tasks. It is not uncommon for accidents to occur to mobile devices over time. Mobile devices can become susceptible to receiving damage when dropped or mishandled, potentially breaking the screen. A broken screen can make the mobile device unmanageable and be costly to repair. Thus, the present invention provides a device to protect the mobile device and provide an auxiliary user interface.

U.S. Pub. No. 2013/0050164 to Nicholaus R. Rericha relates to electronic device cases and covers having a reflective display, and methods thereof. The described electronic device cases and covers having a reflective display, and methods thereof includes an electronic device case for coupling to an electronic device having an illuminated display includes a case body configured to surround two or more edges of the electronic device, and a reflective display within the case body. The reflective display is positioned on a surface of the electronic device that is opposite from the illuminated display of the electronic device when the electronic device case is coupled to the electronic device. The electronic device case further includes a reflective display driver within the case body for controlling the reflective display. The reflective display driver is electrically coupled to the reflective display, receives display data from the electronic device, and controls the reflective display to display the display content corresponding to the display data.

The present invention provides an auxiliary user interface for cracked or non-operational display screens on mobile devices permanently or until repaired. Reflective displays are not a solution for replacing the daily functions of mobile devices as they can be costly and hard to use in certain lighting conditions. Further, reflective displays have a low refresh rate making it difficult to use on electronic or mobile device that have a high degree of user interactivity. As can be seen, a suitable solution is desired.

SUMMARY OF THE INVENTION

In view of the foregoing disadvantages inherent in the known mobile device case and screen art, the present disclosure provides a novel user interface and method. The general purpose of the present disclosure, which will be described subsequently in greater detail, is to provide an auxiliary user interface incorporating touch screen technology.

An auxiliary user interface for a mobile device is disclosed herein. The auxiliary user interface includes a mobile device encasement configured to enclose the mobile device, and an auxiliary capacitive touchscreen fixed to the mobile device encasement and configured to communicably couple with the mobile device when the mobile device encasement is attached to the mobile device. The auxiliary capacitive touchscreen may be integrated with or otherwise configured to operate as the user interface of the mobile device.

According to one embodiment, a method of interfacing with a mobile device is also disclosed herein. The method includes providing an auxiliary user interface for a mobile device, the auxiliary user interface including a mobile device encasement, an auxiliary capacitive touchscreen, and a transfer plug. The mobile device encasement is configured to enclose the mobile device. The auxiliary capacitive touchscreen is fixed to the mobile device encasement and configured to communicably couple with the mobile device when the mobile device encasement is attached to the mobile device, the auxiliary capacitive touchscreen configured to operate as the user interface of the mobile device. The transfer plug is communicably coupled to the auxiliary capacitive touchscreen and configured to physically interface with the mobile device and transfer data between the mobile device and the user interface. The method further includes inserting the mobile device into the mobile device encasement, connecting the transfer plug to an electrical connector on the mobile device, and communicating user input from the auxiliary capacitive touchscreen to the mobile device.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an auxiliary user interface and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to an interface and more particularly to an auxiliary user interface and method for a mobile device as used to improve the protection and management of interfacing with the mobile device.

Generally, the present disclosure enables the continued use of the mobile device after a display screen of the mobile device is damaged, or as a first line of defense such that the display screen is still operable if the user interface is damaged first. In some aspects of use, the auxiliary user interface may be used as a temporary device until the display screen is repaired. With the auxiliary user interface, the mobile device can be further protected and interfaced with a capacitive touch screen. Examples of the mobile device include smartphones, key board phones, tablets, and other computing devices or display screens that can be enclosed within the auxiliary user interface. The present disclosure may further provide a wide range of high-degree interfacing options.

Referring now more specifically to the drawings by numerals of reference, there is shown in FIGS. 1-4, various views of an auxiliary user interface 100 for a mobile device 10.

Figure 1:
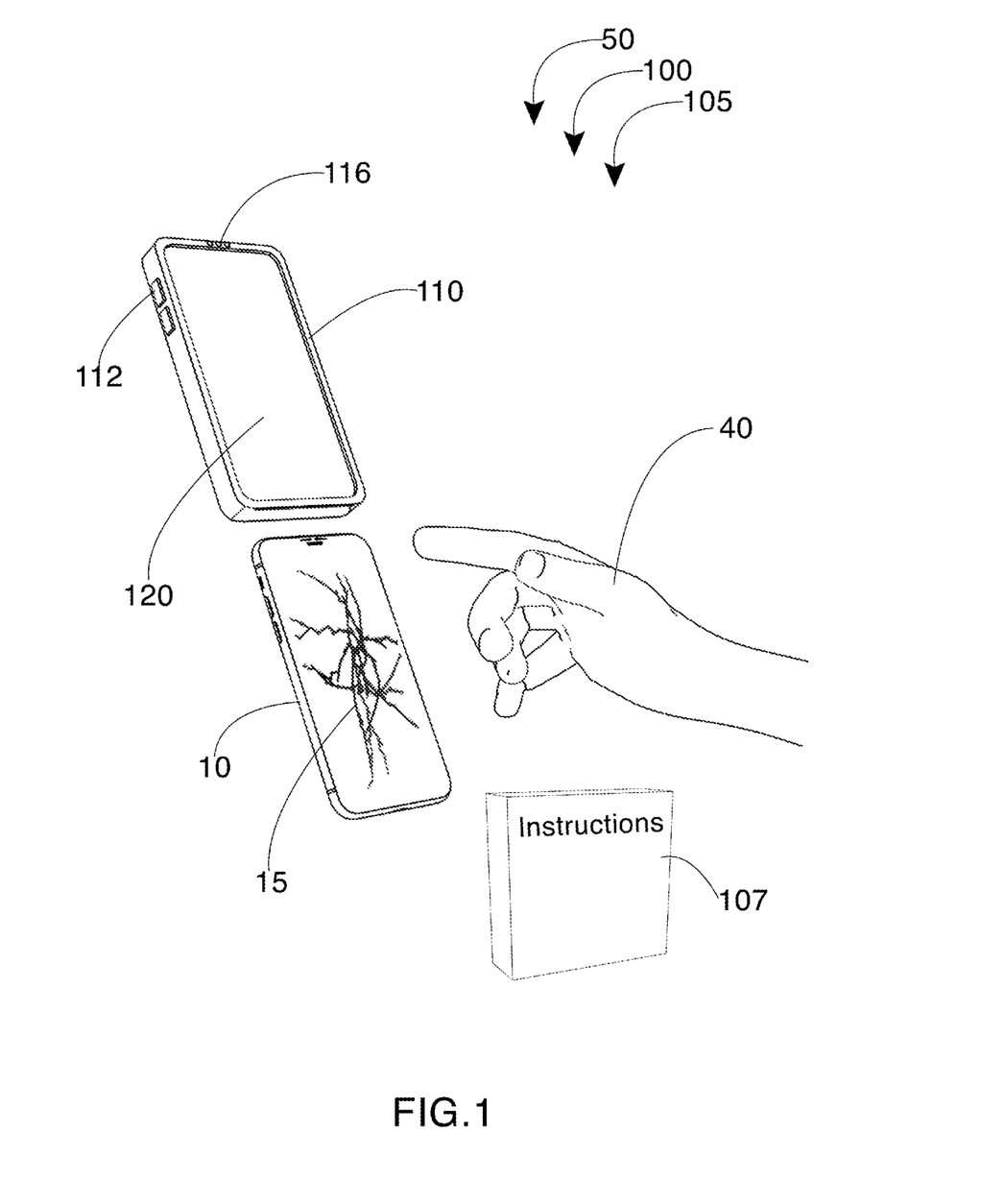
FIG. 1 is an exploded perspective view of the auxiliary user interface during an 'in-use' condition, according to an embodiment of the disclosure.

FIG. 1 shows an auxiliary user interface 100 during an 'in-use' condition 50, according to an embodiment of the present disclosure. Here, the auxiliary user interface 100 may be beneficial for use by a user 40 to provide an alternative source to interface and interact with a mobile device 10. As illustrated, the auxiliary user interface 100 may include a mobile device encasement 110 configured to enclose the mobile device 10, and an auxiliary capacitive touchscreen 120 fixed to the mobile device encasement 110 and configured to communicably couple with the mobile device 10 when the mobile device encasement 110 is attached to the mobile device 10. The auxiliary capacitive touchscreen 120 may be integrated with or otherwise configured to operate as the user interface of the mobile device 10. For example, the mobile device 10 may include an integrated output display and integrated user input, or touch screen, and the auxiliary capacitive touchscreen 120 may be configured to remotely replace or other operate as the touch screen of the mobile device 10. In other embodiments, the auxiliary capacitive touchscreen 120 may operate in parallel with or at the same time as the user interface of the mobile device 10. In other embodiments, the auxiliary capacitive touchscreen 120 may inhibit the user interface of the mobile device 10 (e.g., analogous to a remote mouse inhibiting a touchpad of a laptop). The auxiliary capacitive touchscreen 120 may be configured to operate as a user interface of the mobile device 10. The auxiliary user interface 100 may be used with any mobile devices having a processor 40 such that the auxiliary capacitive touchscreen 120 is operated and driven by the processor 40 of the mobile device 10. Preferably, the auxiliary capacitive touchscreen 120 is an illuminated display such as a liquid crystal display (LCD) or a light emitting diodes (LED) display.

According to one embodiment, the auxiliary user interface 100 may be arranged as a kit 105. In particular, the auxiliary user interface 100 may further include a set of instructions 107. The instructions 107 may detail functional relationships in relation to the structure of the auxiliary user interface 100 such that the auxiliary user interface 100 can be used, maintained, or the like, in a preferred manner.

Figure 2:
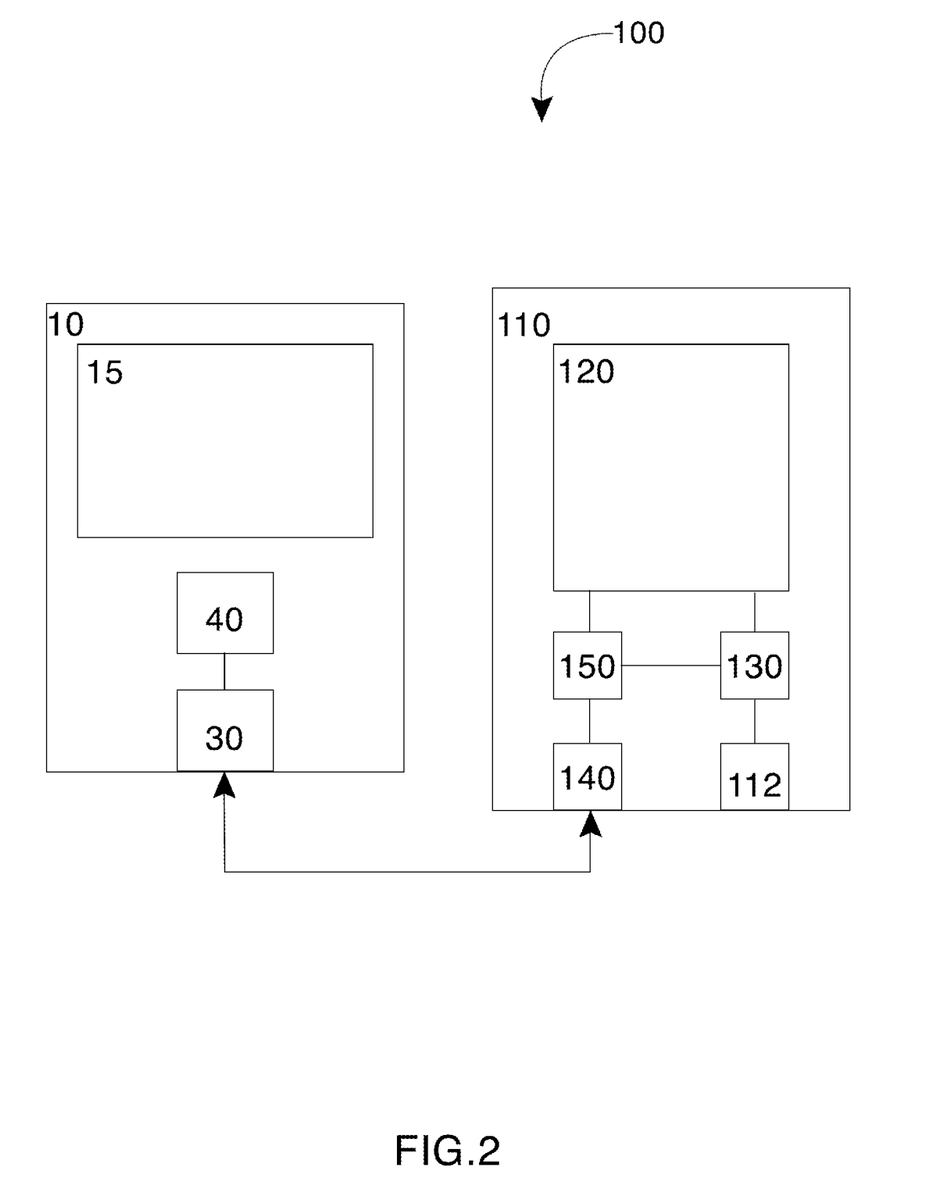
FIG. 2 is a schematic diagram of the auxiliary user interface of FIG. 1, according to an embodiment of the present disclosure.

FIG. 2 is a schematic diagram of the auxiliary user interface 100 of FIG. 1, according to an embodiment of the present disclosure. As above, the auxiliary user interface 100 may include the mobile device encasement 110 configured to enclose the mobile device 10, and the auxiliary capacitive touchscreen 120 fixed to the mobile device encasement 110 and configured to communicably couple with the mobile device 10 when the mobile device encasement 110 is attached to the mobile device. The auxiliary capacitive touchscreen 120 may be configured to operate as an integrated user interface of the mobile device 10.

The mobile device encasement 110 may further include an energy storage 130 coupled to the mobile device encasement 110. The energy storage 130 may be configured to power the auxiliary capacitive touchscreen 120 and/or the mobile device 10 when the mobile device 10 is attached to the mobile device encasement 110. When enclosed within the mobile device encasement 110, it may be difficult to access the mobile device's 10 charging port and inconvenient to remove the mobile device 10 when the battery is depleted. Therefore, mobile device encasement 110 may further include at least one charging port 112 electrically connected to the energy storage 130.

Alternatively, power may be provided to the auxiliary capacitive touchscreen 120 and/or the mobile device 10 from an external energy storage (not shown). In one embodiment, the external energy storage may be a holster type holder configured for cradling the mobile device encasement 110 encasing the mobile device 10. The holster type holder may include a plug for connecting to the at least one charging port 112 and providing power to the auxiliary capacitive touchscreen 120 and/or the mobile device 10.

The auxiliary user interface 100 may communicably couple to the mobile device 10 via electronic hardware. In particular, the auxiliary user interface 100 may further include a transfer plug 140. The transfer plug 140 may be communicably coupled to the auxiliary capacitive touchscreen 120 and may be configured to physically interface with the mobile device 10, for example via an electrical connector 30. The transfer plug 140 may then transfer data between the mobile device 10 and the auxiliary user interface 100. Data transfer may include user input from the auxiliary capacitive touchscreen 120 to the mobile device 10, and user output from the mobile device 10 to the auxiliary capacitive touchscreen 120 in response to the user input. Further, the energy storage 130 may include a charging circuit electrically connected to the transfer plug 140. The charging circuit may be configured to charge the mobile device 10 via the transfer plug 140.

According to one embodiment, the mobile device encasement 110 may further include a display controller 150. The display controller 150 is configured to display mobile device user output onto the auxiliary capacitive touchscreen 120. For example, the mobile device 10 may have a display screen 15, and the display controller 150 may include a display control module communicably coupled to the transfer plug 140. The display controller 150 may provide for communications between the mobile device 10 and the auxiliary capacitive touchscreen 120. In certain aspects, the display controller 150 may include a toggle, on/off button, or the like, attached to the mobile device encasement 110. In some embodiments, the display screen 15 may be disabled during use of the auxiliary capacitive touchscreen 120. While in others, the display screen 15 may be operable during use of the auxiliary capacitive touchscreen 120. This may be desirable when using a wireless communication module 160 (as shown in FIG. 3).

In another aspect of the present disclosure, the display controller 150 may include a software application (SW App) hosted on the mobile device 10. The software application may replace the need for a physical switch. The software application may be downloaded to the mobile device's 10 memory prior to inserting into the mobile device encasement 110 and initiated via interaction with the auxiliary capacitive touchscreen 120.

Figure 3:
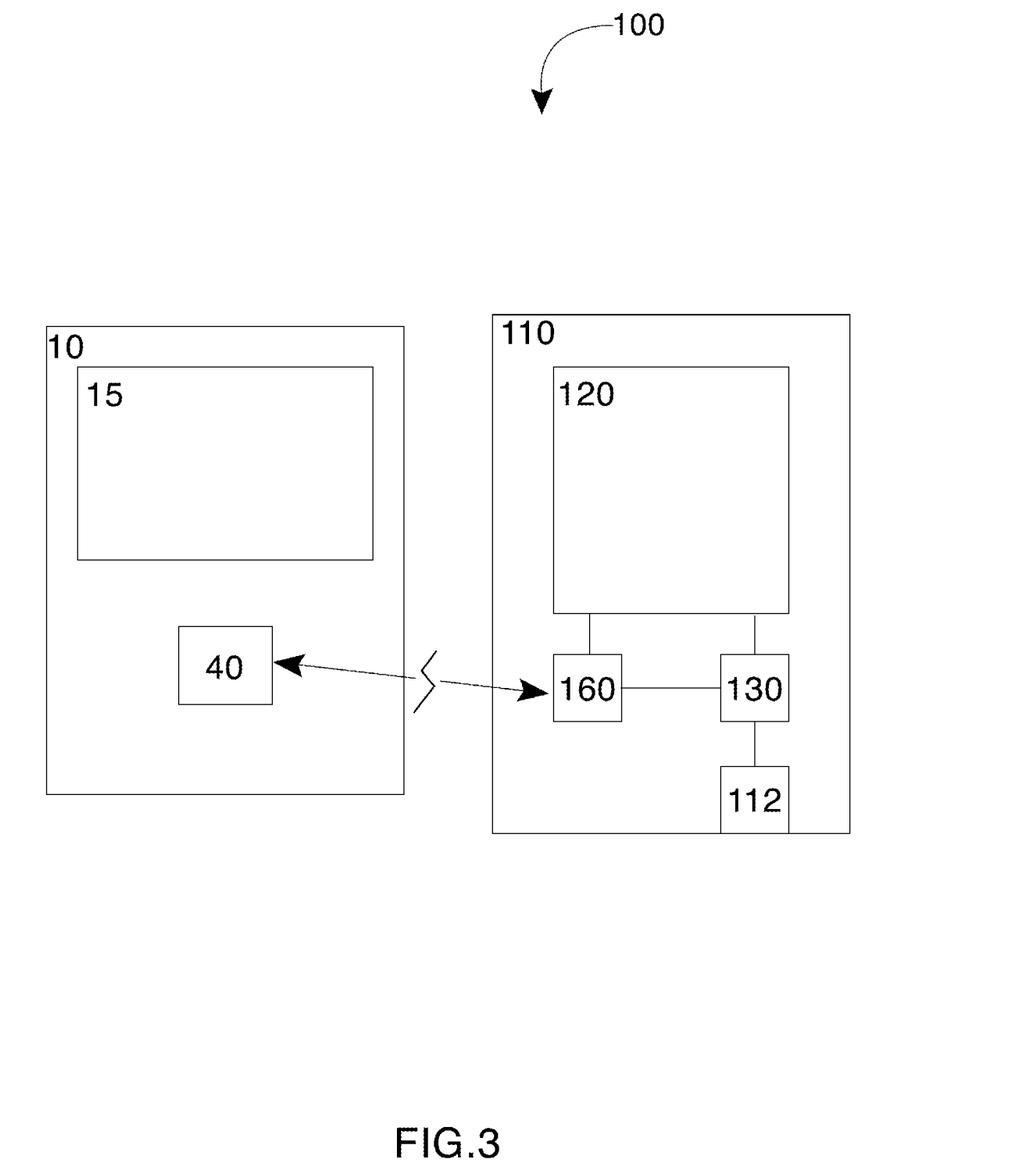
FIG. 3 is a schematic diagram of the auxiliary user interface of FIG. 1, according to another embodiment of the present disclosure.

FIG. 3 is a schematic diagram of the auxiliary user interface 100 of FIG. 1, according to another embodiment of the present disclosure. In this embodiment, the transfer of data is initiated via a wireless communication module 160 adapted to wirelessly communicably couple the auxiliary capacitive touchscreen 120 with the mobile device 10.

In this embodiment, the mobile device 10 may be a wireless communication device, such as a smart phone, or may utilize a plug-in (i.e., a dongle) for plugging into the electrical connector 30 (FIG. 2) on the mobile device 10 and linking with the wireless communication module 160. The wireless communication module 160 can conform to a plurality of wireless communication standards or protocols, including but not limited to WIFI and BLUETOOTH.

The plurality of wireless communication protocols may be established in a two-way direction (full duplex) for fully cooperative communicating. Once wireless communication protocols are established, the wireless communication module 160 may be configured to automatically transfer data between the auxiliary capacitive touchscreen 120 and the mobile device 10 such that user input to the auxiliary capacitive touchscreen 120 will be inputted into the mobile device 10. Those with ordinary skill in the art will now appreciate that upon reading this specification and by their understanding the art of wireless communication as described herein, methods of interfacing via wireless means will be understood by those knowledgeable in such art.

Figure 4:
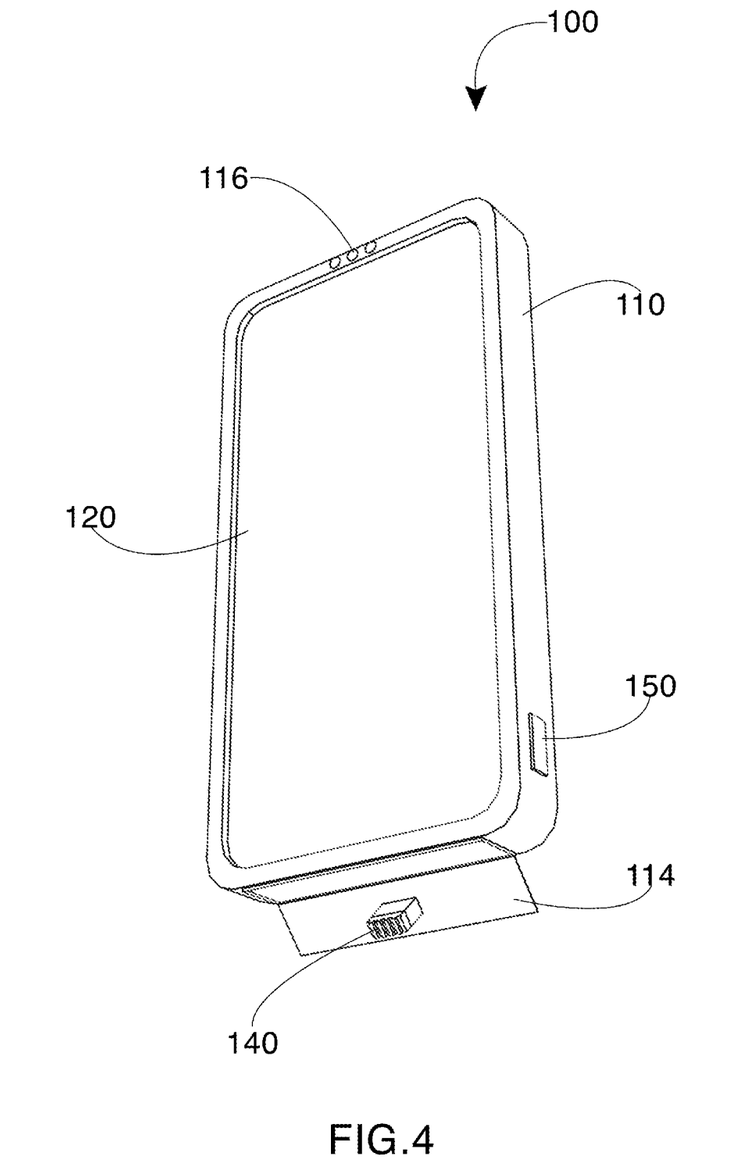
FIG. 4 is a perspective view of the auxiliary user interface of FIG. 1, according to an embodiment of the present disclosure.

FIG. 4 is a perspective view of the auxiliary user interface 100 of FIG. 1, according to an embodiment of the present disclosure. The mobile device encasement 110 may include a door 114 that has an opened state and a closed state. When the door 114 is in the open state, the mobile device 10 may be inserted into or removed from the mobile device encasement 110. The door 114 may be hinged or otherwise pivot along at least one side, front, or back of the mobile device encasement 110. In some embodiments, the transfer plug 140 and associated circuitry may be included within or otherwise coupled to the door 114 and connected to the mobile device encasement 110. In other embodiments, the door 114 may be located on any other side not including the transfer plug 140.

The mobile device encasement 110 may further include at least one aperture 116 through the mobile device encasement 110 that is positioned in alignment with and configured to provide user access to at least one of a speaker and a microphone of the mobile device 10. Optionally, a speaker (not shown) may be housed within the mobile device encasement 110 and include audio circuitry connected to the transfer plug 140 such that audio from the mobile device 10 can be transmitted outside the mobile device encasement 110.

Figure 5:
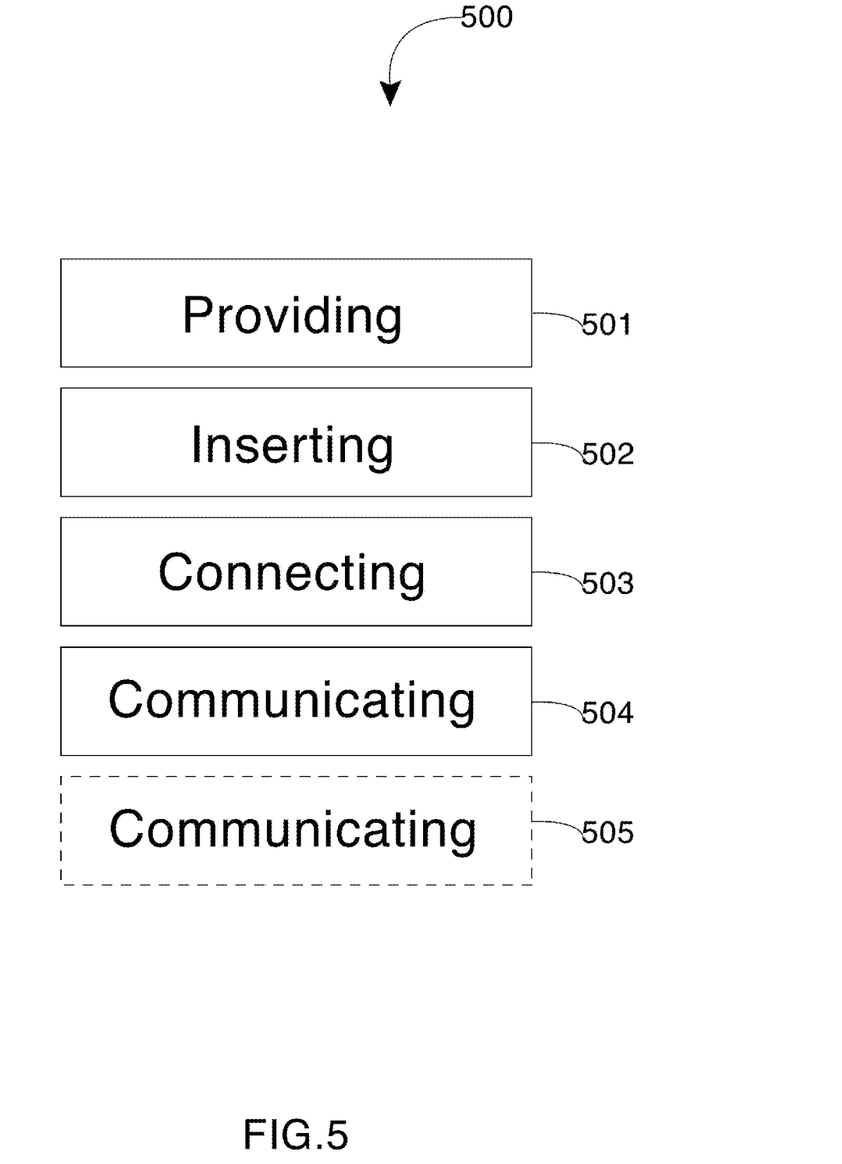
FIG. 5 is a flow diagram illustrating a method interfacing with an auxiliary user interface, according to an embodiment of the present disclosure.

FIG. 5 is a flow diagram illustrating a method for interfacing with a mobile device 500, according to an embodiment of the present disclosure. In particular, the method for interfacing with the mobile device 500 may include one or more components or features of the auxiliary user interface 100 as described above. As illustrated, the method for interfacing with the mobile device 500 may include the steps of: step one 501, providing an auxiliary user interface 100 for a mobile device 10, the auxiliary user interface 100 including a mobile device encasement 110 configured to enclose the mobile device 10, an auxiliary capacitive touchscreen 120 fixed to the mobile device encasement 110 and configured to communicably couple with the mobile device 10 when the mobile device encasement 110 is attached to the mobile device 10, the auxiliary capacitive touchscreen 120 configured to operate as an integrated user interface of the mobile device 10, and a transfer plug 140 communicably coupled to the auxiliary capacitive touchscreen 120, and configured to physically interface with the mobile device 10 and transfer data between the mobile device 10 and the auxiliary user interface 100; step two 502, inserting the mobile device 10 into the mobile device encasement 110; step three 503, connecting the transfer plug 140 to an electrical connector 30 (FIG. 2) on the mobile device 10; step four 504, communicating user input from the auxiliary capacitive touchscreen 120 to the mobile device 10; and step five 505, further comprising the step of communicating user output from the mobile device 10 to the auxiliary capacitive touchscreen 120.

It should be noted that step five 505 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for interfacing with the auxiliary user interface 100 (e.g., different step orders within above-mentioned list, elimination or addition of certain steps, including or excluding certain maintenance steps, etc.), are taught herein.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An auxiliary user interface for a mobile device, the mobile device including an integrated output display and integrated user input, a primary case, and a port, the auxiliary user interface comprising:
- a mobile device encasement configured to enclose the mobile device having a door with a closed configuration and an open configuration wherein the door inserts a transfer plug into the port when the door is moved from an open position to a closed position;
- an auxiliary capacitive touchscreen fixed to the mobile device encasement and configured to communicably couple with the mobile device when the mobile device encasement is attached to the mobile device, the auxiliary capacitive touchscreen configured to operate as the integrated output display and integrated user input of the mobile device
- and
- an energy storage coupled to the mobile device encasement, the energy storage configured to power the auxiliary capacitive touchscreen and the mobile device when the mobile device is attached to the mobile device encasement
- wherein
  - the mobile device encasement includes at least one charging port electrically connected to the energy storage,
  - a native integrated user input of the mobile device is reproduced on the capacitive touchscreen,
  - the mobile device encasement includes a display controller configured to display mobile device user output onto the auxiliary capacitive touchscreen,
  - and
  - the display controller includes a software application hosted on the mobile device.

2. The auxiliary user interface of claim 1, wherein the energy storage includes a charging circuit electrically connected to the transfer plug, said charging circuit configured to charge the mobile device via the transfer plug.

3. The auxiliary user interface claim 1, wherein the mobile device has a display screen, and the display controller includes a display control circuit electrically coupled to the transfer plug.

4. The auxiliary user interface of claim 3, wherein the display screen of the mobile device is operable during use of the auxiliary capacitive touchscreen.

5. The auxiliary user interface of claim 3, wherein the display screen is disabled during use of the auxiliary capacitive touchscreen.

6. The auxiliary user interface of claim 5, wherein the software application is initiated via interaction with the auxiliary capacitive touchscreen.

7. The auxiliary user interface of claim 1, further comprising a wireless communication module adapted to wirelessly communicably couple the auxiliary capacitive touchscreen with the mobile device.

8. The auxiliary user interface of claim 7, wherein the wireless communication module is configured to automatically transfer data between the auxiliary capacitive touchscreen and the mobile device such that user input to the auxiliary capacitive touchscreen will be inputted into the mobile device.

9. The auxiliary user interface of claim 1, wherein the mobile device has a processor, and the auxiliary capacitive touchscreen is operated and driven by the processor on the mobile device.

10. The auxiliary user interface of claim 1, wherein the mobile device encasement includes a door that has an opened state and a closed state, and when in the open state, the mobile device may be inserted into or removed from the mobile device encasement.

11. The auxiliary user interface of claim 1, wherein the mobile device encasement further includes at least one aperture through the mobile device encasement that is positioned in alignment with and configured to provide user access to at least one of a speaker and a microphone of the mobile device.

12. A method of interfacing with a mobile device, the mobile device including an integrated output display and integrated user input, the method comprising the steps of:
- providing an auxiliary user interface for the mobile device, the auxiliary user interface including
  - a mobile device encasement configured to enclose the mobile device having a door with a closed configuration and an open configuration wherein the door inserts a transfer plug into the port when the door is moved from an open position to a closed position,
  - an auxiliary capacitive touchscreen fixed to the mobile device encasement and configured to communicably couple with the mobile device when the mobile device encasement is attached to the mobile device, the auxiliary capacitive touchscreen configured to operate as the integrated output display and integrated user input of the mobile device,
  - an energy storage coupled to the mobile device encasement, the energy storage configured to power the auxiliary capacitive touchscreen and the mobile device when the mobile device is attached to the mobile device encasement,
  - and
  - a transfer plug communicably coupled to the auxiliary capacitive touchscreen, and configured to physically interface with the mobile device and transfer data between the mobile device and the auxiliary user interface,
  - wherein
    - the mobile device encasement includes at least one charging port electrically connected to the energy storage,
    - a native integrated user input of the mobile device is reproduced on the capacitive touchscreen,
    - the mobile device encasement includes a display controller configured to display mobile device user output onto the auxiliary capacitive touchscreen,
    - and
    - the display controller includes a software application hosted on the mobile device;
- inserting the mobile device into the mobile device encasement;
- connecting the transfer plug to an electrical connector on the mobile device;
- and
- communicating user input from the auxiliary capacitive touchscreen to the mobile device.

13. The method of claim 12, further comprising the step of communicating user output from the mobile device to the auxiliary capacitive touchscreen.

* * * * *